United States Patent [19]

Trevarrow

[11] 3,830,586
[45] Aug. 20, 1974

[54] TOOL ADJUSTMENT CAPSULE
[75] Inventor: David J. Trevarrow, Horton, Mich.
[73] Assignee: Shrader Machine & Tool, Inc., Jackson, Mich.
[22] Filed: Aug. 7, 1972
[21] Appl. No.: 278,209

[52] U.S. Cl................. 408/153, 29/105 A, 83/699, 279/1 Q, 408/714
[51] Int. Cl............................................. B23b 29/14
[58] Field of Search.......... 408/147, 154, 156, 714, 408/143, 149, 158, 238, 146, 161, 157, 150, 148; 29/105 A; 83/699, 700, 677; 279/1 Q

[56] References Cited
UNITED STATES PATENTS

| | | | |
|---|---|---|---|
| 700,825 | 5/1902 | Ritter, Jr. | 408/154 X |
| 2,438,741 | 3/1948 | Coulson | 408/154 |
| 2,553,990 | 5/1951 | Vidal | 279/1 Q |
| 2,826,420 | 3/1958 | Klinger | 279/1 Q |
| 3,435,715 | 4/1969 | Jordan | 408/147 |

FOREIGN PATENTS OR APPLICATIONS

| | | | |
|---|---|---|---|
| 1,124,730 | 8/1968 | Great Britain | 29/105 A |

Primary Examiner—Andrew R. Juhasz
Assistant Examiner—Z. R. Bilinsky
Attorney, Agent, or Firm—Beaman & Beaman

[57] ABSTRACT

A device for very accurately adjusting a cutting tool mounted upon a tool holder, such as a turning or boring tool, wherein the adjustment device is in the form of a capsule mounted upon the tool holder. The capsule contains a relatively incompressible pressure transmitting medium such as an elastomer, and a wall of the capsule is deformable against the tool so as to deflect the tool for adjustment purposes upon the force transmitting medium being pressurized by an actuating pin mounted upon the tool holder. The actuating pin is operated by a screw received within a threaded bore. A plurality of actuating pins of different transverse cross-sectional area may be employed for rapid and fine adjustment purposes and the deformable wall is of a variable wall thickness to produce a generally uniform deformation of the deformable wall. An embodiment of capsule is disclosed having a threaded body for major adjustment purposes.

13 Claims, 6 Drawing Figures

PATENTED AUG 20 1974　　　　　　　　　　　3,830,586

TOOL ADJUSTMENT CAPSULE

BACKGROUND OF THE INVENTION

The invention pertains to tool adjustment devices capable of producing highly accurate positioning of a tool with respect to its tool holder.

In all machining processes the various surfaces being machined have specified dimensional tolerances which are acceptable for the particular part being machined. Depending upon the use of the part, the acceptable tolerances widely vary, and where extreme accuracy is required the tolerances of the finished product may be measured in one ten thousandths, one hundred thousandths or even a millionth of an inch. Workpieces machined on lathes and other similar machine tools using a turning principle employ sharp edged cutting tools which are fed into the workpiece, and remove material by a shearing action. Depending upon the material being machined, tolerances measured in tenths of a thousandth of an inch are achievable in turning operations.

Even though a machining operation may be capable of maintaining tolerances measurable in lengths of a thousandth of an inch, the adjustment of tools capable of cutting accuracy, such as lathe tools, boring tools, and the like, is difficult due to the minute adjustment required to maintain such accuracies. Additionally, cutting operations wherein tolerances are measured in tenths of a thousandth of an inch require frequent adjustment due to dimensional changes occurring from tool wear, and with conventional adjustment devices presently available the maintaining of accurate adjustment of cutting tools is troublesome and time consuming.

Lathe type cutting tools, including boring tools for machining the bores of parts rotated upon a lathe or similar turning tool, are normally rapidly adjusted by screw devices supporting the tool such as carriages and compounds. Minute tool adjustments have heretofore been accomplished on lathe and boring tools by devices mounted on the tool holder which position or deflect the tool with respect to the tool holder, and as such finely adjustable devices often must create high forces on the tool to deflect the same, high mechanical advantages are created by the use of cams or screw threads. However, such known mechanical tool adjustment devices are expensive to manufacture, troublesome in use, and prone to require constant attention and readjustment, and are limited in their use due to the size of the tool holder necessary to accommodate such adjustment devices.

SUMMARY OF THE INVENTION

It is an object of the invention to provide a tool adjustment capsule which is of a concise configuration and may be readily employed with a wide variety of configurations and dimensions of tool holders, such as lathe tool devices, boring bars and the like, which is capable of very accurately positioning a tool and maintaining the tool position once adjusted.

It is a further object of the invention to provide a tool adjustment capsule capable of incorporation into a conventional size tool holder which is able to produce minute deflection of a firmly supported tool in order to adjust the tool relative to the tool holder a distance within the cutting tolerances of the machine tool and tool with which it is employed.

In the practice of the invention a tool capsule is incorporated into a tool holder which includes a chamber in which a relatively incompressible force transmitting medium, such as an elastomer, is enclosed. The capsule includes a deformable wall, and an actuating pin is mounted in the tool holder and is adjusted by a screw for introduction into the capsule to displace the medium, such as elastomer, creating sufficient force on the medium to outwardly displace the deformable wall and thereby displace and adjust the tool. The screw adjustment of the actuating pin, in combination with the displacement of the elastomer and the deformation of the deformable wall produces a significant multiplication of forces to produce high compressive pressures within the capsule for accurately positioning and maintaining the location of the tool with respect to its tool holder.

The capsule in accord with the invention may be formed by a pair of cylindrical cup shaped members having side walls telescopically press fitted together. One of the end walls of the cup shaped members defines the deformable capsule wall, and preferably, the thickness of the deformable wall adjacent its peripheral region is less than at its central region whereby the outward deformation of the wall at the central region is in a direction generally parallel to the undeformed configuration of the deformable wall, rather than causing the deformable wall to convexly bow outwardly. Aligned openings are defined in the cup shaped members' side walls for receiving a cylindrical actuating pin slidable within a bore defined in the tool holder.

In a variation of the invention two actuating pins communicate with the capsule chamber for displacement of the force transmitting elastomer, one of the pins having a greater transverse cross-sectional area than the other whereby a rapid adjustment of the capsule may be achieved, and the smaller actuating pin may be employed to create the fine and more accurate adjustment.

An additional embodiment of the invention provides for the initial positioning of the tool adjustment capsule and the tool holder by the use of threads formed in a recess defined in the tool holder, and the fine adjustment is created by the displacement of the force transmitting medium and the deformable wall by the use of an actuating pin and screw system.

BRIEF DESCRIPTION OF THE DRAWING

The aforementioned objects and advantages will be apparent from the following description and accompanying drawings wherein.

DESCRIPTION OF THE PREFERRED EMBODIMENTS

The tool adjustment capsule in accord with the invention may be used with a wide cariety of cutting tools which are mounted upon tool holders. The invention is particularly suitable for use with turning type tools such as used with lathes, and the like, and in FIG. 1 a typical environment in which the invention is used as illustrated wherein the tool holder consists of a boring head for machining the inside of workpieces rotated upon a lathe.

Figure 1:
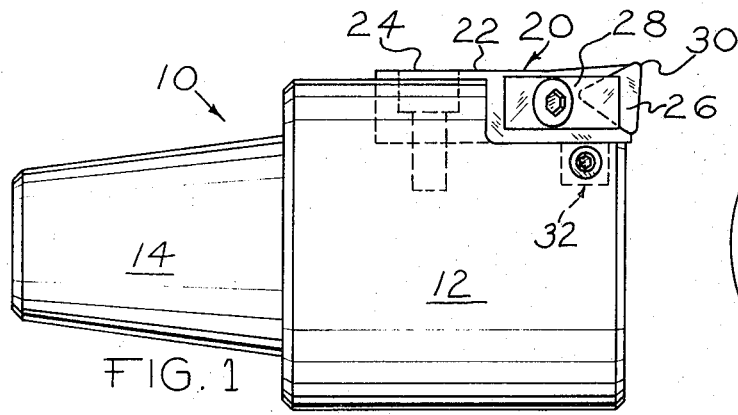
FIG. 1 is a top plan view of a boring head tool holder utilizing a tool adjustment capsule in accord with the invention.

With reference to FIG. 1, the boring head tool holder 10 includes an enlarged tool supporting portion 12, and a tapered portion 14 adapted to be received within lathe tailstock or turret structure or the like for supporting the boring head. The head portion 12 includes a tool receiving recess or notch as defined by planar surfaces 16 and 18, FIG. 2, and the tool, generally indicated at 20, includes a support base 22 adapted to normally be tightly held against the surfaces 16 and 18 by a bolt 24, FIG. 1, extending through a hole defined in the tool base, and threaded into a bore defined in the tool holder portion 12. Actual cutting is produced by the tool tip or insert 26, usually formed of a hard carbide material so as to retain its cutting edge over long periods of use. The carbide insert is maintained upon the tool base by bonding or other means, which may include, or be supplemented by, a holddown plate and screw 28 connected to the tool base 22. In the disclosed embodiment of the invention cutting occurs at the location 30, FIG. 1.

Figure 2:
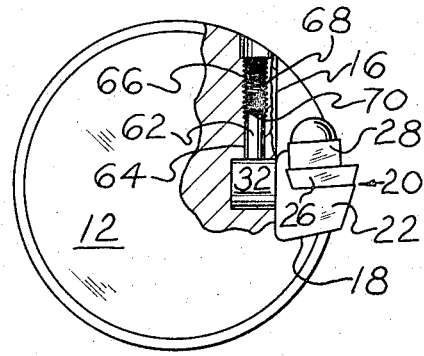
FIG. 2 is a view of the tool holder of FIG. 1 as taken from the right, partially in section, to illustrate the tool adjustment capsule.

The tool adjustment capsule is generally indicated at 32, and is mounted within a blind cylindrical recess 34 defined in the tool member portion 12 intersecting the surface 16, as will be appreciated from FIG. 2. The tool capsule includes an inner cup shaped member 36 having a side wall 38 of cylindrical configuration and an end wall 40. An outer cup shaped member 42 includes cylindrical side walls 44 and an end wall 46, and the outer diameter of the member 36 is such as to form a tight press fit with the inner diameter of the side walls 44 when the members 36 and 42 are assembled in the manner apparent from FIG. 3. With respect to FIG. 3, it will be noted that the axial length of the side walls 38 is such that upon the member 36 being fully inserted into the member 42 the outer surface of the end wall 40 aligns with the end of the side walls 44 of the cup shaped member 42. The member 36 is provided with a cylindrical hole 48 in its side wall, and the member 42 is formed with an opening 50, which is concentric to the opening 48 when the components are assembled as in FIG. 3. By making the diameter of the hole 50 larger than the hole 48 alignment of the holes during assembly is simplified.

Figure 3:
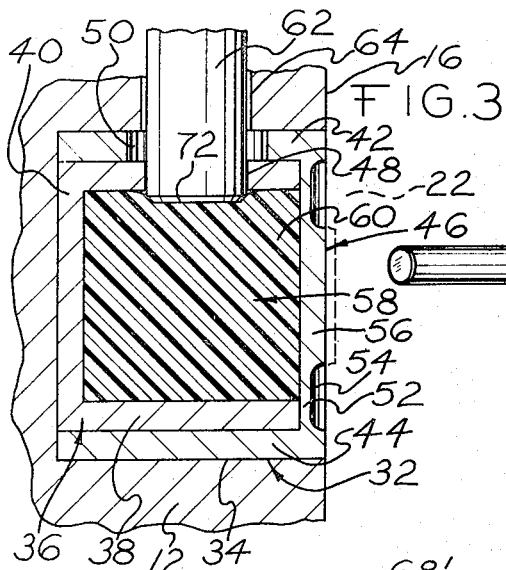
FIG. 3 is an enlarged detail, elevational, sectional view of the tool adjustment capsule illustrating the deformation of the deformable wall in dotted lines.
Figure 4:
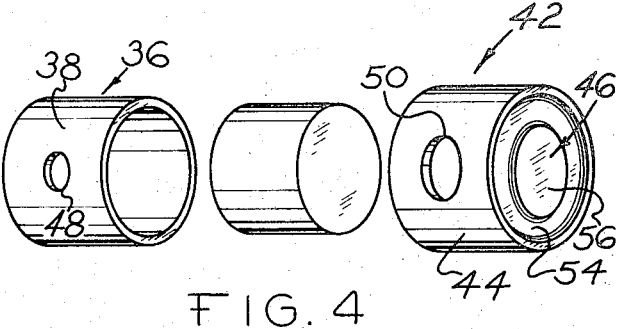
FIG. 4 is an exploded perspective view of the capsule components and actuating pin.

The end wall 46 of the outer cup shaped member 42 includes a peripheral region 52 at the location where the end wall attaches to the side wall 44, and this peripheral region is of a reduced thickness as will be appreciated in FIG. 3 due to the presence of an annular recess 54, FIG. 4, defined in the end wall. Thus, the central region of the end wall 46 as represented at 56, FIG. 3, is of a greater thickness than at the peripheral region of the end wall.

The assembly of the members 36 and 42 as shown in FIG. 3, defines an internal cylindrical chamber 58 within the capsule. The cylindrical chamber 58 is filled with a relatively noncompressible force transmitting medium, such as an elastomer 60, such as rubber, polyurethane or equivalent material. It is also to be appreciated that the chamber 58 could be filled with a fluid, grease, or small solid particles such as shot or sand. The nature of the medium filling the chamber 58 is such that displacement of the medium, or a compressive force exerted at one location thereon, exerts a like force at other locations within the chamber due to the noncompressible characteristic of the medium.

The medium within the chamber 58 is pressurized by means of an actuating pin 62 axially displaceable within a bore 64 defined in the tool holder portion 12, FIG. 2. The bore 64 is at least partially threaded, as at 66, and is provided with a smooth wall adjacent the tool capsule 32 wherein the actuating pin may be closely slideably received therein. A screw 68 within the threaded bore portion 66 engages the end 70 of the actuating pin within the bore threaded portion, and the screw is preferably of the Allen type having a hexagonal socket defined therein for receiving a conventional Allen wrench for permitting rotation of the screw.

The end 72 of the actuating pin 62 disposed toward the capsule 32 extends through the opening 50, and through the opening 48 of the cup shaped members. The diameter of the opening 48 is only slightly greater than the diameter of the actuating pin whereby the medium within the chamber 58 cannot extrude through the opening 48 between the actuating pin and the opening edges. Preferably, the end 72 of the actuating pin is chamfered.

Initially, the tool capsule will be in the condition shown in full lines in FIG. 3. The recess 34 is of sufficient depth to fully receive the capsule such that the outer surface of the end wall 46 is in substantial alignment with the tool positioning surface 16 defined on the tool holder. Initially, the actuating pin 62 is located within the opening 48, but does not extend into the chamber 58, and no pressure is being exerted upon the elastomer 60 by the pin end 72. The tool base 22 will be engaging the surfaces 16 and 18 as the tool capsule end wall 46 is in alignment with the surface 16, the tool capsule will have no effect upon the positioning of the tool base and tool.

If it is desired to position the tool cutting edge 30 with respect to the boring head 10 for adjustment purposes, such as to compensate for tool wear or to produce a dimensional variation, in the neighborhood of several ten thousandths of an inch, such adjustment can be readily accomplished by the operator inserting an Allen wrench into the recess defined in the accessible end of screw 68, FIG. 2, and rotating the screw to cause the inner end 72 of the actuating pin 62 to enter the chamber 58.

As the inner end of the actuating pin 62 enters the chamber 58 the elastomer material 60 is encountered, and is displaced and pressurized by the actuating pin. Such pressure produced in the elastomer medium causes all of the chamber wall surfaces engaged by the medium to be subjected to the compressive pressure within the elastomer, and as all of the tool capsule surfaces and walls, except end wall 46, are confined within the recess 34 the only deformation that can occur is the outward displacement of wall 46. Thus, as the screw 68 is tightened to project the actuating pin 62 further into the chamber 58 the internal pressures created within the elastomer medium cause the wall 46 to deform to the right, FIG. 3, against the tool base 22 causing the tool base to move away from the surface 16 and adjusting the position of the cutting edge 30 with respect to the tool holder 10. Such movement of the tool base 22 is due to deformation in the base since the tool base is attached to the boring head tool holder by the bolt 24. Of course, as the movement produced in the tool base is in the nature of only several ten thousandths of an inch, the bending of the tool base 22 is not great, but is sufficient to produce the desired result.

It is desired that the pressures exerted on the tool base by the deformable wall 46 be dispersed over a significant area, and by reducing the wall thickness at the peripheral region 52 the central region 56 of the wall tends to deform outwardly in a generally planar nature parallel to the initial plane of the wall prior to deformation, as represented in the dotted lines of FIG. 3. Of course, the degree of movement of the dotted line representation in FIG. 3 is exaggerated for purpose of illustration. If the wall 46 were not provided with a reduced wall thickness at the peripheral region the wall would arcuately convexly "bulge" outwardly producing point contact with the tool base 22, and such point contact, while providing tool adjustment, is less desirable than the greater surface contact area between the wall and the tool base achievable by employing the wall configuration illustrated.

It will therefore be appreciated that the adjustment of the screw 68 permits a very fine adjustment of the tool position relative to its holder to be accomplished due to the mechanical multiplication inherent in the screw movement, and the small but positive deformation produced in the wall 46. The compressive forces within the elastomer medium 60 are effective to resist movement of the tool base back toward the surface 16, and the tool adjustment, once obtained, may be accurately maintained. If the operator should overadjust the tool, the "backing off" of the screw 68 permits the central region of the wall 46 to move to the left, FIG. 3, toward the chamber and the resiliency in the tool base will move the tool base in a like direction so that the desired position of the tool may be readily achieved in either direction of tool movement.

Figures 5, 6:
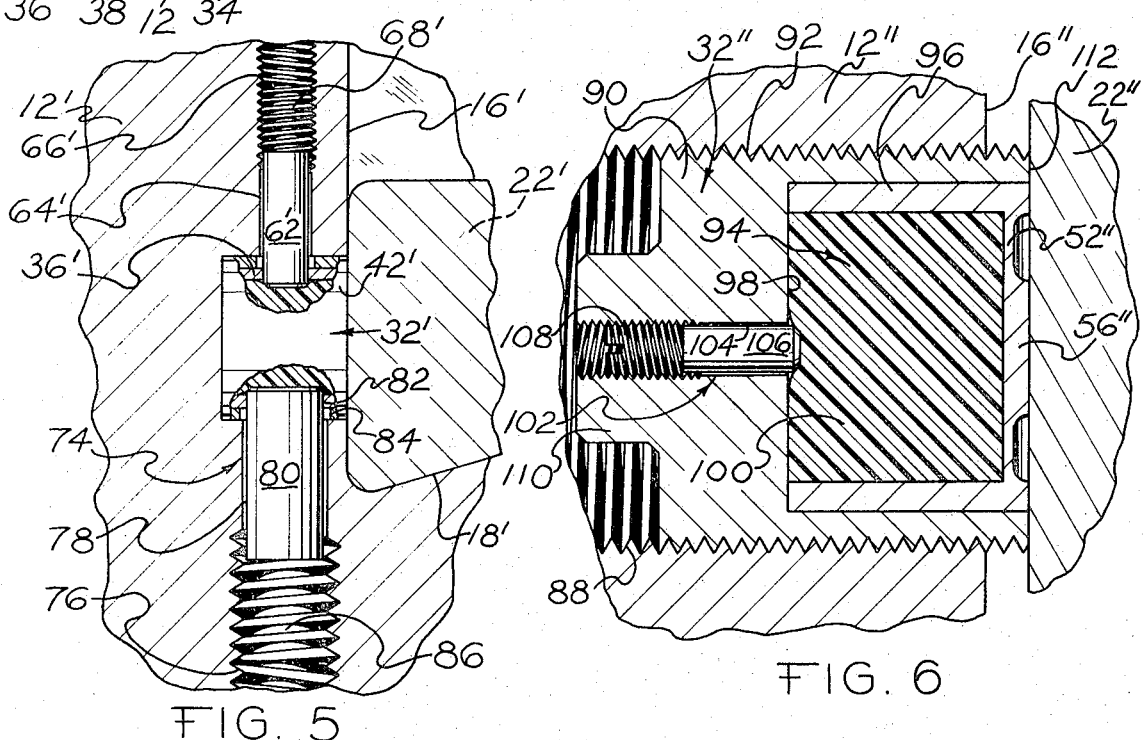
FIG. 5 is an enlarged, detail, elevational, sectional view of a modification of the invention utilizing two actuating pins of different size.
FIG. 6 is an enlarged detail, elevational, sectional view of another variation in accord with the invention utilizing a threaded initial adjustment feature.

A variation of the inventive concept is illustrated in FIG. 5 wherein components similar to those previously described are indicated by primed reference numerals. As will be appreciated, the embodiment of FIG. 5 is identical to that of FIG. 3 except that a second bore 74 is defined within the tool holder 10' having a threaded portion 76 and a cylindrical smooth bore portion 78. An actuating pin 80 is axially displaceably received within the bore portion 78. The cup shaped members 36' and 42' are provided with holes 82 and 84, similar to holes 48 and 50 previously described, but of a sufficient diameter to receive the pin 80. The pin 80 is of a larger transverse cross-sectional area than the pin 62', and thus the rotation of the screw 86 by an Allen wrench to produce a given linear displacement of the acuating pin 80 will produce a greater deformation of the capsule wall 46' than a like axial displacement of the actuating pin 62' in that a greater amount of elastomer medium 60' is displaced due to the greater dimension of the pin 80. Thus, screw 86 and pin 80 may be employed to produce major tool adjustment under the influence of the capsule 32', while the screw 68' and pin 62' may be employed for producing fine tool adjustment.

Another embodiment of the inventive concept is shown in FIG. 6 wherein preliminary or "rough" adjustment of the tool capsule is produced by thread means. In the embodiment of FIG. 6 components similar to these previously described are designated by double primes and this embodiment includes a threaded bore 88 defined in the tool holder 10' having an axis perpendicularly disposed to the tool positioning surface 16''. In FIG. 6 the tool base is represented at 22''.

The tool capsule includes a cylindrical cup shaped member 90 having exterior threads 92 defined thereon which cooperate with the bore threads, and rotation of the member 90 axially positions the member within the bore as desired.

The member 90 includes a cylindrical recess 94 in which the cup shaped member 96 is received with a press fit. The cup shaped member 96 is identical to the member 42 previously described, except no opening 50 is defined in the side wall thereof. A chamber is defined by the member 96, and the recess end wall 98, and the force transmitting elastomer medium 100 is received within this chamber.

A bore 102 is coaxially defined in the member 90 and includes a threaded portion and a smooth bore portion 104 which intersects the recess end wall 98. The actuating pin 106 is located in the smooth bore portion 104, and the screw 108 bears upon the end of the actuating pin. Access to the screw 108 for insertion of an Allen wrench into the screw's hexagonal recess is through the bore 88 from the left, FIG. 6.

In the embodiment of FIG. 6 the capsule is used in the following manner. Initial adjustment of the tool capsule with respect to the tool base 22'' is accomplished by rotation of the member 90. Such rotation is produced by applying a wrench to the member boss 110, which is of a hexagonal configuration, such that a socket wrench or the like may be connected thereto for rotating the member 90. As the member 90 is rotated to move the member to the right, the annular edge 112 will engage the tool base 22'' and move the tool base to the right away from the positioning surface 16'' to provide a rough adjustment of the tool cutting edge with respect to the tool holder. When it is desired to finely adjust the tool the operator inserts an Allen wrench into the screw 108, and rotates the screw to project the actuating pin 106 into the recess 94 to pressurize the elastomer medium 100 and deform the wall 46'' outwardly to the right for further moving the tool base to the right and away from the member edge 112. Thus, it will be appreciated that the embodiment of FIG. 6 provides a major "rough" adjustment by employing the threads of member 90, and permits a fine adjustment capable of positioning the tool within ten thousandths of an inch by the compression of the medium within recess 94.

It is appreciated that various modifications to the inventive concept may be apparent to those skilled in the art without departing from the spirit and scope of the invention.

I claim:

1. A tool adjustment device for accurately adjusting a cutting tool relative to its holder directly mountable within the tool holder adjacent the cutting tool comprising, in combination, a hollow capsule having a side wall defining an internal chamber and including a deformable end wall integral with said side wall defining an end of said capsule and engageable with the cutting tool, a relatively incompressible force transmitting medium within said capsule chamber, and means associated with said capsule communicating with said chamber for compressing said medium and outwardly deforming said wall against the cutting tool to adjust the tool relative to its holder.

2. In a tool adjustment device as in claim 1 wherein said means compressing said medium comprises a plunger displaceable into said capsule chamber.

3. In a tool adjustment device in claim 1 wherein said force transmitting medium comprises an elastomer.

4. In a tool adjustment device as in claim 3 wherein said elastomer comprises a polyurethane material.

5. In a tool adjustment device as in claim 1 wherein said deformable wall includes a supported peripheral region adjacent said side wall and a central region, the wall thickness of said deformable wall at said peripheral region being less than the wall thickness at said central region whereby a relatively uniform outward displacement of said wall central region occurs during wall deformation.

6. In a tool adjustment device as in claim 1 wherein said capsule comprises a pair of cup shaped members each having side walls and an end wall, said side walls being telescopically press fitted together to define said chamber and the end wall of one of said members defining said deformable wall.

7. In a tool adjustment device as in claim 6, aligned openings defined in said member side walls, said means compressing said force transmitting medium extending through said openings.

8. A tool adjustment device comprising, in combination, a tool holder having tool mounting means defined thereon, said tool mounting means including a surface defined on said tool holder disposed adjacent to a tool support mounted on said holder, a recess defined within said tool holder intersecting said surface, a tool adjustment capsule within said recess, said capsule including a hollow housing defining a chamber and having a deformable wall for extending from said surface and engaging a tool support mounted on said holder, a relatively incompressible force transmitting medium within said chamber, a bore fixed relative to said tool holder during operation of said capsule in alignment with said chamber and having a threaded portion, an opening defined in said capsule housing in alignment with said bore and communicating with said chamber, an actuating pin axially displaceable within said bore having a first end projecting through said opening engaging said force transmitting medium for displacement of said medium to outwardly deform said wall away from said surface and a second end within the bore threaded portion, and screw means within said bore threaded portion engaging said actuating pin second end for axially positioning said pin and determining the extent of the projection of said pin first end into said chamber and the extent of deformation of said deformable wall for adjustment of the tool support engaged by said wall.

9. In a tool adjustment device as in claim 8 wherein said force transmitting medium comprises an elastomer.

10. In a tool adjustment device as in claim 9 wherein said first mentioned bore is defined in the body of said tool holder, a second bore defined in the body of said tool holder in alignment with said chamber having a threaded portion, a second opening defined in said capsule housing in alignment with said second bore communicating with said chamber, a second actuating pin axially displaceable within said second bore having a first end having a greater transverse cross-sectional area than said first end of said first mentioned actuating pin projecting through said second opening engaging said force transmitting medium and having a second end within the threaded portion of said second bore, and second screw means within said second bore threaded portion engaging said second end of said second pin whereby adjustment of said second pin permits rapid adjustment of said deformable wall.

11. In a tool adjustment device as in claim 8 wherein said capsule comprises a pair of cup shaped members each having side walls and an end wall, said side walls being telescopically press fitted together to define said chamber and the end wall of one of said members defining said deformable wall.

12. In a tool adjustment device as in claim 8 wherein said deformable wall includes a supported peripheral region and a central region, the wall thickness of said deformable wall at said peripheral region being less than the wall thickness at said central region whereby a relatively uniform outward displacement of said wall central region occurs during wall deformation.

13. In a tool adjustment device as in claim 8 wherein said recess comprises a threaded bore, said capsule including an outer member having exterior threads defined thereon mating with the threads within said threaded recess for selective axial positioning therein, said chamber and deformable wall being defined on said outer member, and said bore receiving said actuating pin being defined within said outer member.

* * * * *